United States Patent [19]

Chesler et al.

[11] 4,308,432
[45] Dec. 29, 1981

[54] AUXILIARY CRADLE HOLDING DEVICE FOR A TELEPHONE

[76] Inventors: Richard S. Chesler, 531 Main St., Roosevelt Island, N.Y. 10044; Gary Strauss, 515 Harrison, Harrison, N.Y. 10528

[21] Appl. No.: 151,954

[22] Filed: May 21, 1980

[51] Int. Cl.³ .................................................. H04M 1/08
[52] U.S. Cl. .................................................. 179/149
[58] Field of Search ............ 179/1 HS, 100 C, 100 D, 179/146 R, 149, 150, 159

Primary Examiner—George G. Stellar

[57] ABSTRACT

The present invention relates to an auxiliary cradle holding device which is removably attached to a desk type telephone, wherein the handset of the telephone is removably received on the cradle holding device and the cylindrical plunger members of the telephone are in a depressed position, when the handset is positioned on the cradle holding device.

12 Claims, 11 Drawing Figures

AUXILIARY CRADLE HOLDING DEVICE FOR A TELEPHONE

FIELD OF THE INVENTION

The present invention relates to an auxiliary cradle holding device which is removably attached to a desk type telephone, wherein the handset of the telephone is removably received on the cradle holding device and the cylindrical plunger members of the telephone are in a depressed position, when the handset is positioned on the cradle holding device.

PRIOR ART

A number of U.S. Patents are related to telephone auxiliary cradle holding devices. These patents are: U.S. Pat. Nos. 2,703,823; 2,686,848; 2,705,264; 2,541,712; 2,658,116; 2,634,338; 2,182,496; and 2,100,887.

U.S. Patent No. 3,480,741 which is also related to cradle holding devices is substantially different from the instant invention. While this patent provides a means for holding a handset remotely away from the cradle position of a telephone while maintaining the cylindrical plunger members of the telephone in a depressed position, this patent fails to provide:

1. Adequate means for securing the device to the telephone;
2. A device that extends vertically upwardly from the telephone;
3. The improved mechanism of the instant invention;
4. The article which covers the device;
5. The means for holding the phone unit upwardly and forwardly of the cradle position of the telephone.

SUMMARY OF THE INVENTION

The present invention relates to an auxiliary cradle holding which is adapted to be removably attached to a desk type telephone, wherein the handset of the telephone is removably received on the cradle holding device. The cradle holding device comprises an L-shaped element having a vertically disposed leg and a horizontally disposed leg; a first plate member; a first pivot means for pivotally joining the first plate member to an upper end of the vertically disposed leg of the L-shaped member, wherein the first plate member extends horizontally and forwardly out from the vertically disposed leg of the L-shaped member; a pair of spaced arm members affixed to a forward edge of the first plate member, wherein the arm members extend outwardly and forwardly from the first plate member and the arm members are adapted to removably receive a handset of the telephone thereon; an elongated bar member is affixed to the horizontally disposed leg of the L-shaped member on an upper surface of the horizontally disposed leg along a junction of the horizontally disposed leg and the vertically disposed leg of the L-shaped member; a second plate member; a pair of flange members, one of the flange members being affixed to one side of the second plate member and the other flange member being affixed to the other side of the second plate member, wherein the flange members are adapted to removably engage the cylindrical plunger members of the telephone; a second pivot means for pivotally joining the second plate member along a rear edge thereof to the elongated bar member; a strap member which is pivotally affixed at its upper end to the first plate member by third pivot means and the strap member is affixed at its lower end to the second plate member by fourth pivot means; a tension means such as a spring communicating between the fourth pivot means and the upper end of the vertically disposed leg of the L-shaped member; and a means for removably securing the cradle holding device to the telephone, wherein a geometrically shaped article can be provided which is designed to fit over and cover the auxiliary cradle holding device, wherein the arms of the cradle holding device extend outwardly through slots in a wall of the geometrically shaped holding device.

DESCRIPTION OF THE PREFERRED EMBODIMENTS

Figures 1, 2:
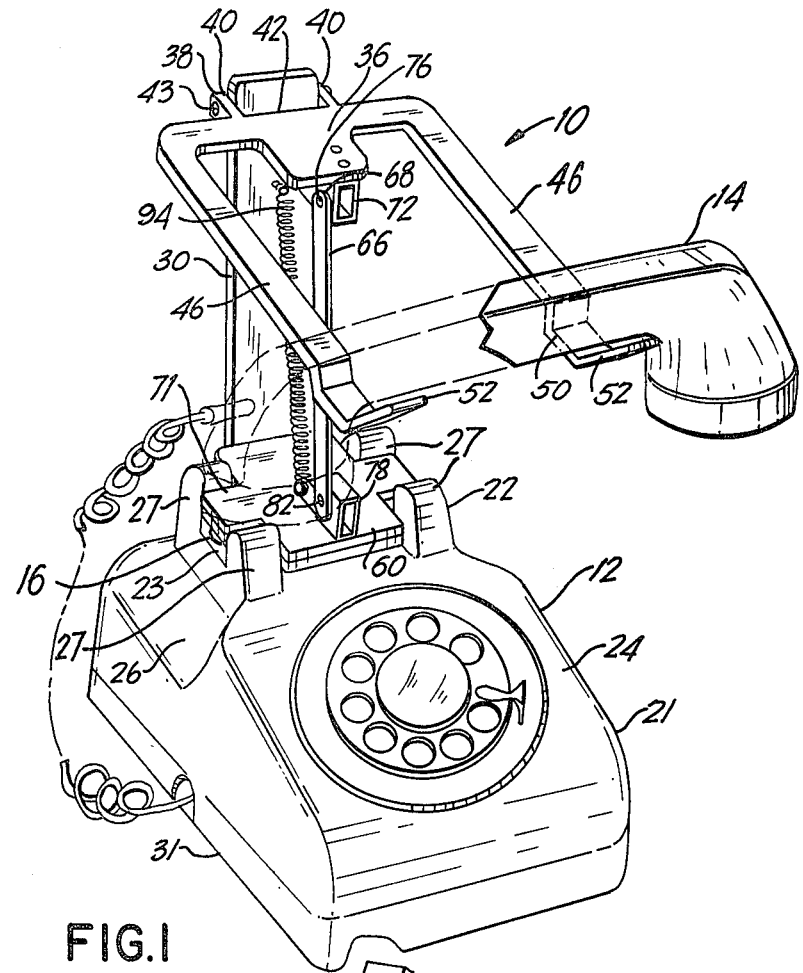
FIG. 1 illustrates a forward perspective of the auxiliary cradle holding device affixed to a desk type telephone.
FIG. 2 illustrates a rear perspective view of the auxiliary cradle holding device affixed to the desk type telephone.
Figure 3:
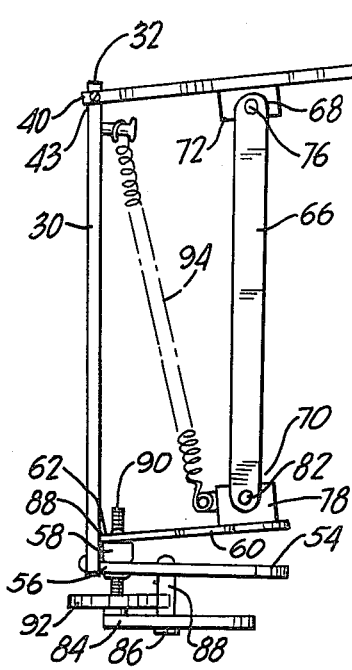
FIG. 3 illustrates a side view of a first embodiment of the auxiliary cradle holding device.
Figure 4:
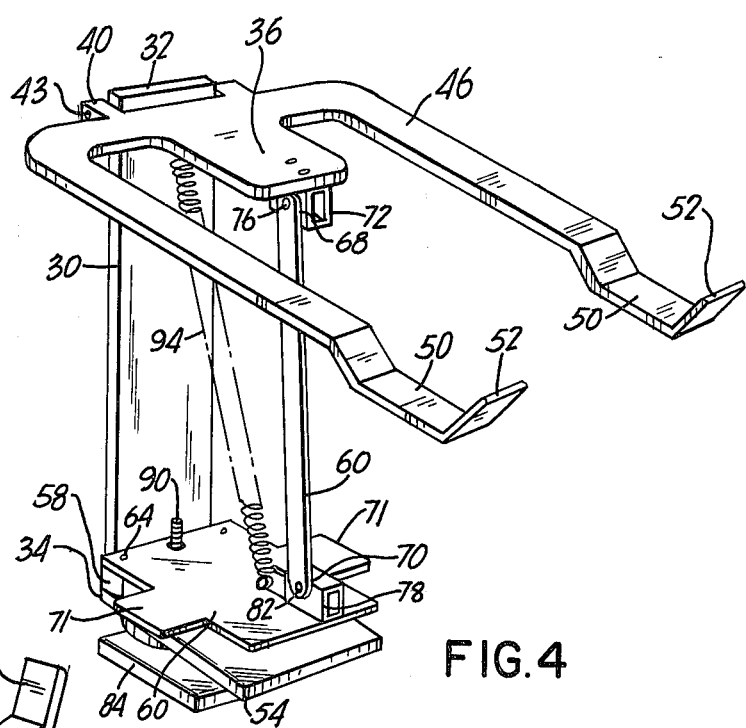
FIG. 4 illustrates a front perspective view of the first embodiment of the auxiliary cradle holding device.
Figure 5:
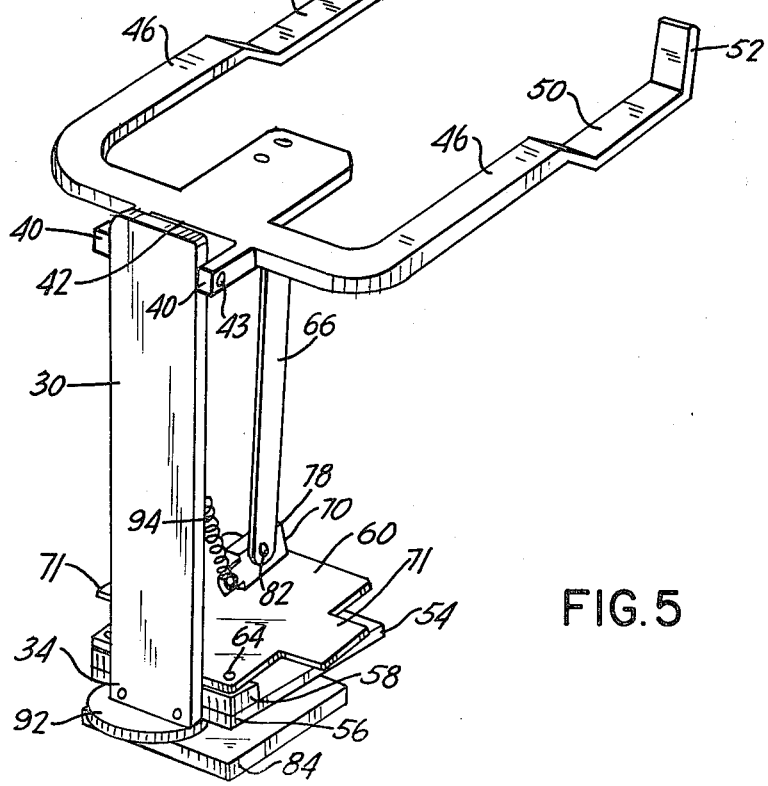
FIG. 5 illustrates a rear perspective view of the first embodiment of the auxiliary cradle holding device.

FIGS. 1–5 show an auxiliary cradle holding device 10 adaptable to be removably received on a desk type telephone 12 as depicted in FIGS. 1–2, wherein the cradle holding device 10 is adaptable to removably receive a handset of the telephone 12 therein. The placement of the handset 14 on the cradle holding device causes the cylindrical plunger members 16 of the telephone 12 to be depressed. When the phone unit 14 is removed from the cradle holding device 10, the cylindrical plunger members 16 are released from their depressed position. The telephone as depicted in FIGS. 1–2 generally comprises a base portion 21, a pedestal portion 22 and a cradle portion 23. The pedestal portion 22 comprises a front, upwardly and inwardly sloping wall 24, a rear upwardly and inwardly sloping wall 25 and a pair of parallel, vertically, upwardly and inwardly extending side walls 26 terminating in the cradle portion 23 which is provided with two pairs of spaced tines 27 and two cylindrical plunger member 16, one of the plunger members being positioned mid-way between each pair of tines 27 and extending downwardly into the hollow interior of the telephone 12. The pedestal portion 22 contains a recess 30 in the rear wall 25 under the cradle portion 23. The upper wall of the recess is defined by the lower surface 31 of the horizontal element 32 of the cradle portion 23.

The auxiliary cradle holding device as depicted in FIGS. 1-5 generally comprises an elongated rectangularly shaped, vertically extending member 30 having an upper end 32 and a lower end 34. A first plate member 36 which can be rectangularly shaped as depicted is perpendicularly joined by first pivot means 38 to the upper end 32 of member 30, wherein member 36 extends outwardly and forwardly in a horizontal plane from member 30. The first pivot means 38 generally comprises, for example, a pair of spaced flanges 40 extending outwardly from the rear edge 42 of member 36, wherein the upper end 32 of member 30 is disposed between flanges 40. A screw member 43 extends transversely through each flange 40 and transversely into the upper end 32 of member 30 and terminates therein. Obviously other pivot means 38 than that depicted can be readily employed. A pair of spaced elongated arm members 46 are affixed to the forward edge 48 of member 36 and extend outwardly, forwardly, and downwardly therein terminating into a substantially horizontal portion 50. The outer end 52 of the horizontal portion 50 of each arm 46 is curved upwardly in a vertical direction. The handset 14 is removably placed on the horizontal portion 50 of the arms 46. A second rectangularly shaped plate member 54 is affixed perpendicularly to the lower end 34 of member 30 and extends horizontally and outwardly therefrom. To the upper surface of plate member 54 and along a rear edge 56 of the plate member 54 is affixed an elongated bar member 58. The rear edge of a third rectangularly shaped plate member 60 is joined by second pivot means 62 onto the top of elongated bar member 58, wherein plate member 60 extends outwardly and forwardly from the elongated bar member 58. A side flange member 71 is affixed to each side of third plate member 60. The dimensions of the third plate member 60 and the two side flange members 71 are such that they are insertable between the spaces as defined between each pair of tines 27 and the two tines 27 of each pair and above the cradle portion 23 of the telephone 12, wherein the flange members 71 are removably engagable upon the cylindrical plunger members 16. The second pivot means comprises a plurality of screw members 64 extending downwardly through the rear edge of the third plate member 60, elongated bar member 58 and the second plate member 54, wherein the third plate member 60 and elongated bar member 58 are spaced apart.

An upper end of a rigid strap member 66 is joined to the first plate member 36 by a third pivot means 68, wherein strap member 66 extends forwardly and downwardly from plate member 36. The lower end of the rigid strap member 66 is joined by a fourth pivot means 70 to the third plate member 60. The third pivot means 68 comprises a first bracket member 72 which is affixed centrally by screw means to a lower surface of the fist plate member 36 at a forward edge thereof, wherein bracket member 72 extends downwardly from plate member 36. The upper end of strap member 66 is pivotally joined to bracket member 72 by a first pin member 72 extending transversely through the upper end of strap member 66 and bracket member 72. The fourth pivot means 70 comprises a second bracket member 78 which is affixed centrally by screw member means to an upper surface of the third plate member 60 at a forward edge thereof, wherein bracket member 78 extends upwardly from plate member 60. The lower end of strap member 66 is pivotally joined to bracket member 78 by a second pin member 82 extending transversely through the lower end of strap member 66 and bracket member 78. A spring member or elastic band member 94 or any other suitable tension means is joined at one end to the upper end of member 30 and at the other end of spring member 94 is joined to the fourth pivot means 70. Spring member 94 provides a counter balance against the weight of the first plate member 36 and arm members 46 that is sufficient to permit the third plate member 60 to be pulled upwardly and away from the cradle portion 23 of the telephone 12, when the handset 14 of the telephone 12 is removed from the arms 46, so that flange members 71 are disengaged from the cylindrical plunger members 16. A fourth rectangular shaped plate member 84 is positioned below, parallel to, and spaced apart from the second plate member 54, wherein a pair of bolt elements 86 extend downwardly through plate member 54 through the center of plate member 84. A sleeve member 88 is disposed on each screw element 86 on the portion of the screw element existing between plate members 54, 84. A fifth pivot means is provided for pivotally moving upwardly the forward end of plate member 84, when sufficient pressure is exerted in a downwardly direction upon the upper rear surface of plate member 84. This fifth pivot means 88 comprises a bolt member 90 thready engaged upwardly through plate member 54, elongated bar member 58, and plate member 60, wherein the head of bolt member 90 extends below plate member 54 and removably engages upon the upper rear surface of plate member 84. A circular disc member 92 is disposed on bolt member 90 between plate members 54, 84, wherein disc member is disposed in a parallel configuration to plate member 54. When disc member 92 is rotated in a clockwise direction, bolt member 90 moves downwardly causing the rear end of plate member 84 to be moved downwardly and away from plate member 54 thereby causing the forward end of plate member 84 to move upwardly and towards plate member 54. When disc member 92 is rotated in a counterclockwise direction, bolt member 90 moves upwardly and disengages from the rear end of plate member 84 thereby permitting the forward end of plate member 84 to be moved downwardly and away from plate member 54. In use, the auxiliary cradle holding device 10 is detachably mounted on the telephone by means of the second plate member 54 engaging upon the upper surface 35 of the horizontal element 32 of the cradle portion 23. The fourth plate member 84 of the cradle holding device 10 extends forwardly into the recess 30 in the rear wall 25 under the cradle portion 23 and the forward edge of the fourth plate member 84 engages against the lower surface 31 of the horizontal element 32 of the cradle portion 23. When the handset 14 is placed on the horizontal portion 50 of the arms 46, plate member 36 moves downwardly which causes strap member 66 to move downwardly thereby causing the third plate member 60 to move downwardly so that side flange members 71 engage onto and cause cylindrical plunger members 16 to be depressed.

Figure 6:
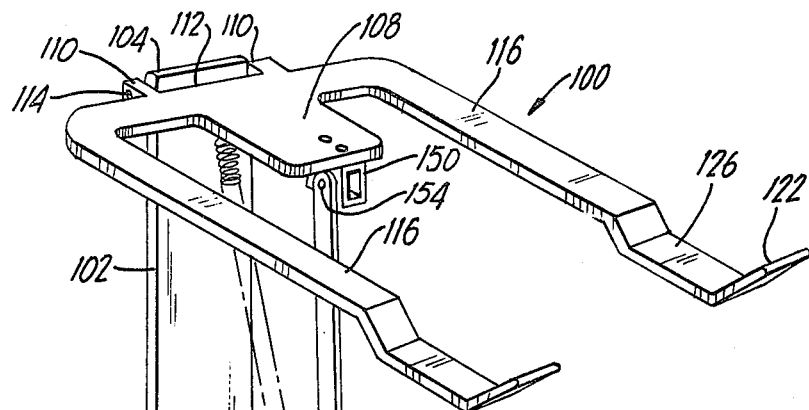
FIG. 6 illustrates a front perspective view of a second embodiment of the auxiliary cradle holding device.
Figure 7:
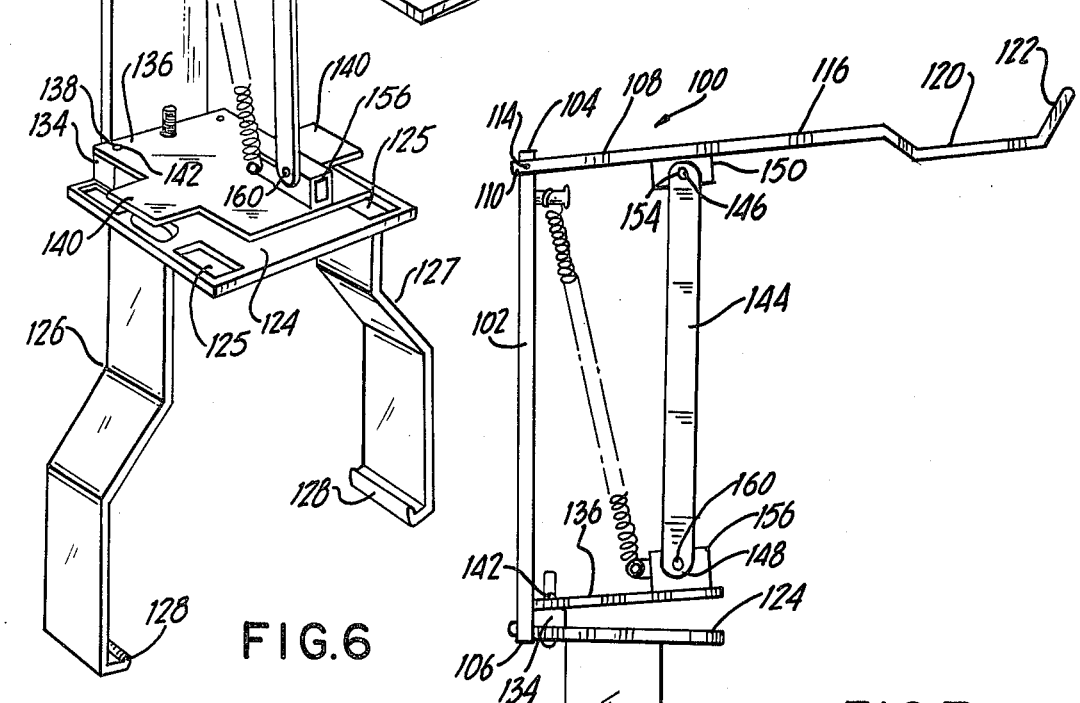
FIG. 7 illustrates a side view of the second embodiment of the auxiliary cradle holding device.
Figure 8:
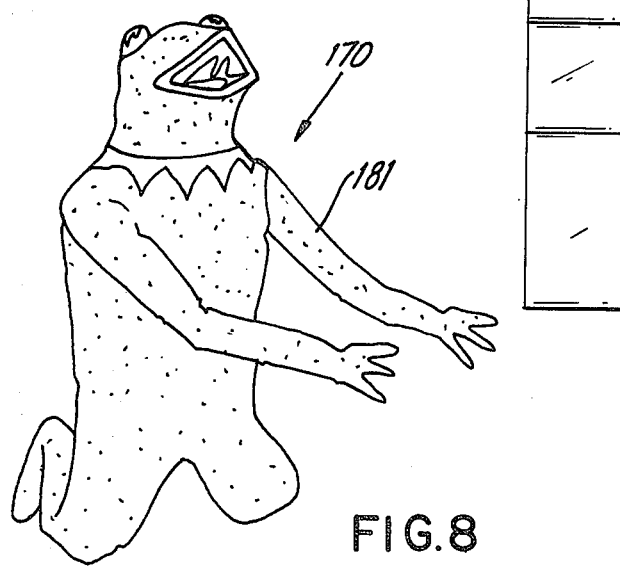
FIG. 8 illustrates a perspective view of a cartoon animal which is representative of an article design to fit over and cover the auxiliary cradle holding device of either embodiment 1 or 2.
Figure 9:
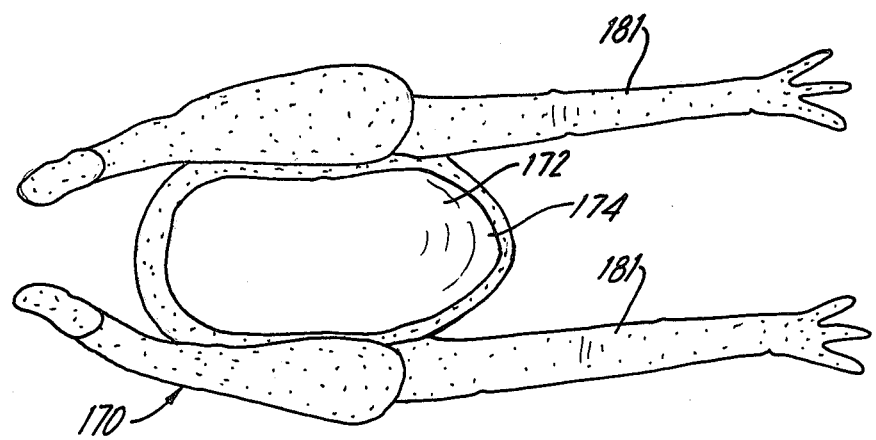
FIG. 9 illustrates a bottom view of the article of FIG. 8.
Figure 10:
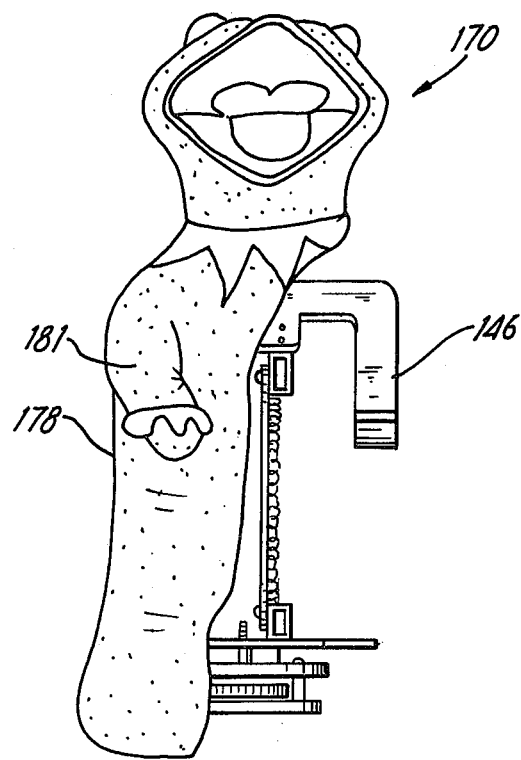
FIG. 10 illustrates a front partially cutaway view of the article disposed on the auxiliary cradle holding device.
Figure 11:
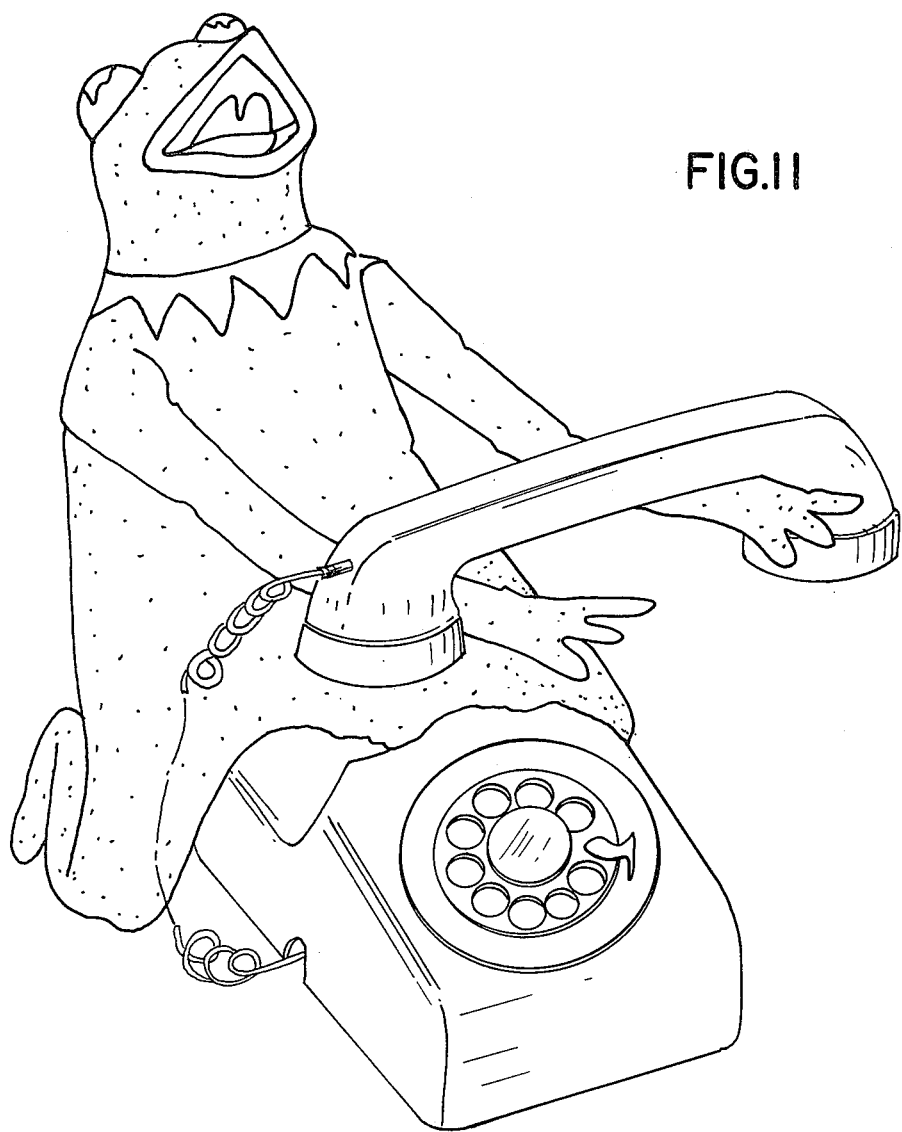
FIG. 11 illustrates a front perspective view of the article of FIG. 8 disposed on the auxiliary cradle holding device which is mounted on the desk type telephone.

FIGS. 6-7 depicted an alternate embodiment of the instant invention. The auxiliary cradle holding device 100 generally comprises an elongated rectangularly shaped, vertically extending member 102 having an upper end 104 and a lower end 106. A first plate member 108 which can be rectangularly shaped as depicted, is perpendicularly joined by first pivot means to the upper end 104 of member 102, wherein member 108 extends outwardly and forwardly in a horizontal plane from member 102. The first pivot means generally comprises a pair of spaced flanges 110 extending outwardly from the rear edge 112 of member 108, wherein the upper end 104 of member 102 is disposed between flanges 110. A screw member 114 extends transversely through each flange 110 and transversely into the upper end 104 of member 102 and terminates therein. A pair of spaced elongated arm members 116 are affixed to the forward edge of member 108 and extend outwardly, forwardly, and downwardly therefrom terminating in a substantially horizontal portion 120. The outer end 122 of the horizontal portion 120 of each arm 116 is curved upwardly in a vertical direction. A second rectangularly shaped plate member 124 having six openings 125 therethrough is affixed perpendicularly to the lower end 106 of member 102 and extends horizontally and outwardly therefrom. The openings 125 are positioned in plate member 124 so that plate member 124 can be horizontally positioned on the cradle portion 23 of the telephone 12, wherein the cylindrical plunger members 16 extend upwardly through two of the openings 125 and the four tines 27 of the telephone 12 extend upwardly through the remaining openings 125. A pair of flexible strap elements 126, 127 are provided wherein the upper end of one of the strap elements 126 is affixed to one side of plate member 124 and the first strap element 126 extends downwardly from plate member 124. A first clamp means 128 is affixed to the lower end of the first strap element 126, wherein clamp means 128 is adapted to clamp over, around and onto the lower edge 31 of the base portion 21 of the telephone 12. The upper end of the second strap element 127 is affixed to the other side of plate member 124 and the second strap element 127 extends downwardly from plate member 124. A second clamp means 128 is affixed to the lower end of the second strap element 127, wherein clamp means 128 is adapted to clamp over, around and onto the lower edge 31 of the base portion 21 of the telephone 12. To the upper surface of the second plate member 124 and along a rear edge of the plate member 124 is affixed on elongated bar member 134. The rear edge of a third rectangularly shaped plate member 136 is joined by second pivot means 138 onto the top of elongated bar member 134, wherein plate member 136 extends outwardly and forwardly from the elongated bar member 134. A side flange member 140 is affixed to each side of plate member 136. The dimensions of the plate member 136 and the two side flange members 140 are such that they are insertably between the spaces as defined between each pair of tines 27 and the two tines 27 of each pair and above the cradle portion of the telephone 12, wherein the flange members 140 are removably engagable upon the cylindrical plunger members 16. The second pivot means 138 comprises a plurality of screw members 142 extending downwardly through the rear edge of the third plate member 136, the elongated bar member 134, and the second plate member 124, wherein the third plate member 136 and the elongated bar member 134 are spaced apart. An upper end of a strap member 144 is joined to the first plate member 108 by a third pivot means 146, wherein strap member 144 extends forwardly and downwardly from plate member 108. The lower end of rigid strap member 144 is joined by a fourth pivot means 148 to the third plate member 136. The third pivot means 146 comprises a first bracket member 150 which is affixed centrally by screw means to a lower surface of the first plate member 108 at a forward edge thereof, wherein first bracket member 150 extends downwardly from plate member 108. The upper end of strap member 144 is pivotally joined to bracket member 150 by a first pin member 154 extending transversely through the upper end of strap member 144 and bracket member 150. The fourth pivot means 148 comprises a second bracket member 156 which is affixed centrally by screw means to an upper surface of the third plate member 136 at a forward edge thereof, wherein bracket member 156 extends upwardly from plate member 136. The lower end of strap member 144 is pivotally joined to the second bracket member 156 by a second pin member 160 extending transversely through the lower end of strap member 144 and the second bracket member 156. A spring member or elastic band member or any other suitable tension means is joined at one end to the upper end of member 102 and the other end of spring member is joined the fourth pivot means 148. Spring member acts as in the first embodiment as a counterbalance means. As in the first embodiment, when the handset 14 is placed on arms 116, the flange members 140 move downwardly to engage and depress downwardly the cylindrical plunger members 16 of the telephone 12. When the handset 14 is removed from the arms 116, the flange members 140 move upwardly and disengage from the cylindrical plunger members 16 of the telephone 12 thereby permitting the cylindrical plunger member 16 to be released from their depressed position.

Obviously, various modifications can be readily made and are to be considered within the spirit and scope of the instant invention. For example the elongated rectangularly shaped, vertically extending member (30 or 102) and the second plate member (54 or 124) can be of a unitary construction in the form of one L-shaped member having a vertically upward extending leg and a horizontally extending leg.

The auxiliary cradle holding device (10 or 100) can be readily modified by the use of a geometrically shaped article 170 as depicted in FIGS. 8–11 which fits over and covers the auxiliary cradle holding device (10 or 100). The geometrically shaped article 170 can be of any shape of design such as an animal, a person, a building or any other article of use as long as it has a hollow interior 172 and an open base 174. Clamp means are provided on the rear interior surface of the article 170, wherein clamp means are removably attachable onto the vertically extending elongated member (30 or 102) of the device (10 or 100). The vertically extending elongated member (30 or 102) of the device (10 or 100) can be an integral part and form a portion of the upwardly extending wall 178 of the article 170 in which case the article 170 is not removable from the device (10 or 100). The arms (46 or 116) of the device 10 are disposed within the outwardly extending and flexible arms 181 of the geometrically shaped article 170. Particularly desirable articles are figures of cartoon characters such as Snoopy, Charlie Brown, Donald Duck and other cartoon characters, superheroes and robots, and puppets such as Miss Piggy, Pink Panther, Mork of Ork, Superman, Spiderman, Hulk, Cookie Monster, Big Bird, and Kermit the Frog, which is depicted for illustrative purposes in FIGS. 8-11. Also particularly desirable articles are famous buildings and robots such as the Empire State Building, the World Trade Center, Chrysler Building, R2D2, and C3PO.

In use the article fits over the device (10 or 100) and extends downwardly to completely cover the cradle portion 23 of the telephone and partially cover the pedestal portion 22 and base portion 21 of the telephone 12.

What is claimed is:

1. An auxiliary cradle holding device adapted to be removably affixed to a desk type telephone which comprises:
   (a) an L-shaped element having a vertically disposed leg and a horizontally disposed leg;
   (b) a first plate member;
   (c) a first pivot means for pivotally joining said first plate member to an upper end of said vertically disposed leg of said L-shaped member, said first plate member extendng horizontally and forwardly out from said vertically disposed leg of said L-shaped member;
   (d) a pair of spaced arm members affixed to an edge of said first plate member, said arm member extending outwardly and forwardly from said first plate member, said arm members being adapted to removably receive a handset of said telephone thereon;
   (e) an elongated bar member, said elongated bar member affixed to said horizontally disposed leg of said L-shaped member on an upper surface of said horizontally disposed leg of said L-shaped member along the juncture of said vertically disposed leg and said horizontally disposed leg of said L-shaped member;
   (f) a second plate member;
   (g) a pair of flange members, one of said flange members being affixed to one side of said second plate member and the other said flange members being affixed to the other side of said second plate member, said flange members being adapted to removably engage the cylindrical, plunger members of said telephone;
   (h) a second pivot means for pivotally joining said second plate member along a rear edge thereof to said elongated bar member;
   (i) a strap member;
   (j) a third pivot means for pivotally joining an upper end of said strap member to said first plate member;
   (k) a fourth pivot means for pivotally joining a lower end of said strap member to said second plate member;
   (l) a tension means communicating between said fourth pivot means and said upper end of said upper end of said vertically disposed leg of said L-shaped member; and
   (m) means for removably securing said auxiliary cradle holding device to said telephone.

2. A device according to claim 1, wherein said tension means is resiliently deformable.

3. A device according to claim 2, wherein said securing means comprises said horizontally disposed leg of said L-shaped element having six openings therethrough, said opening being disposed so that the tines and the cylindrical plunger members of said telephone are adapted to extend upwardly through said openings, when said horizontally disposed leg of said L-shaped element is disposed on a cradle portion of said telephone.

4. A device according to claim 3, wherein said securing means further includes:
   (a) a pair of flexible strap elements, one of each strap elements being affixed to each side of said horizontally disposed leg of said L-shaped element;
   (b) a pair of clamp means, one of each said clamp means being affixed to a free end of each said strap elements, said clamp means being adapted to removably engage a base portion of said telephone.

5. A device according to claim 2, wherein said securing means further comprises:
   (a) a third plate member disposed under, spaced apart from, and parallel to said horizontally disposed leg of said L-shaped element;
   (b) a pair of screw members, said screw members extending downwardly through a center of said horizontally disposed leg of said L-shaped element and downwardly through a center of said third plate member, said horizontally disposed leg of said L-shaped element being adapted to be received on an upper surface of a horizontal portion of said cradle portion of said telephone, said third plate member being adapted to extend into a rear recess of a pedestal portion of said telephone, wherein a forward edge of said third plate member is adapted to removably engage upon a lower surface of said horizontal portion of said cradle portion of said telephone;
   (c) a bolt member having a head, said bolt member extending upwardly through said horizontal disposed leg and said elongated bar member, said head of said bolt member being disposed below said horizontally disposed leg of said L-shaped member, said head of said bolt removably engaging an upper rear surface of said third plate member; and
   (d) means for turning said bolt member.

6. A device according to claim 5, wherein said turning means comprises a disc shaped member disposed on said bolt member between said horizontally disposed leg of said L-shaped member and said third plate member, said head of said bolt member removably engaging the upper surface of said third plate member.

7. A device according to claim 1, further including a geometrically shaped article having a hollow interior, an open base and at least one upwardly extending wall having a pair of slots therethrough, said article being disposed over said auxiliary cradle holding device, said arms extending through said slots.

8. A device according to claim 7, further including a means for securing said article to said cradle holding device.

9. A device according to claim 8, wherein said means for securing said article to said cradle holding device comprises at least one clamp means disposed on an interior surface of said wall of said article within said hollow interior, said clamping means engaging onto said vertically disposed leg of said L-shaped member.

10. A device according to claim 7, wherein said vertically disposed leg of said L-shaped member is an integrally formed portion of said article.

11. A device according to claim 7, wherein said article is in a shape of a cartoon figure.

12. A device according to claim 7, wherein said article is in a shape of a building.

* * * * *